United States Patent [19]
Nudelman et al.

[11] 4,119,467
[45] Oct. 10, 1978

[54] CEMENT AND PROCESS FOR PRODUCING SAME

[76] Inventors: Boris Izrailovich Nudelman, Chilanzar, kvartal 8, 27, kv. 48; Marsel Yanovich Bikbau, massiv Junus-Abad, B-2, 21, kv. 58; Alexandr Sergeevich Sventsitsky, Severo-Vostok-2, 50, kv. 64; Anatoly Yokovlevich Gadaev, kvartal Ts-5, 41, kv. 24; Ada Mirovna Prikhozhan, Mukimi, 1, kv. 95; Isaak Mozesovich Bun, Chilanzar, kvartal 8, 6a, kv. 19, all of Tashkent, U.S.S.R.

[21] Appl. No.: 797,678

[22] Filed: May 17, 1977

[51] Int. Cl.² ............................................... C04B 7/02
[52] U.S. Cl. .................................................. 106/100
[58] Field of Search ........................... 106/89, 100, 104

[56] References Cited
U.S. PATENT DOCUMENTS

| | | | |
|---|---|---|---|
| 3,628,973 | 12/1971 | Greening et al. | 106/100 |
| 3,782,992 | 1/1974 | Uchikawa et al. | 106/89 |
| 3,864,138 | 2/1975 | Uchikawa et al. | 106/89 |
| 3,942,994 | 3/1976 | Murray et al. | 106/104 |
| 3,947,283 | 3/1976 | Uchikawa et al. | 106/104 |
| 4,028,126 | 6/1977 | Mori et al. | 106/104 |

Primary Examiner—J. Poer
Attorney, Agent, or Firm—Robert E. Burns; Emmanuel J. Lobato; Bruce L. Adams

[57] ABSTRACT

A cement having the following composition, parts by weight:

| | |
|---|---|
| alite | 1 to 50 |
| belite | 1 to 45 |
| calcium chloroaluminate | 30 to 1 |
| highly-basic calcium chlorosilicate | 75 to 5 |
| calcium chloro-orthosilicate | 55 to 5 |
| calcium chlorcalumoferrite | 2 to 22. |

The cement is made by mixing the following ingredients, in parts by weight, calcareous component (calculated for CaO) 34 to 44, silicaceous component (calculated for $SiO_2$) 9.5 to 17, aluminous component (calculated for $Al_2O_3$) 1.6 to 14, ferrous component (calculated for $Fe_2O_3$) 0.8 to 5, calcium chloride (calculated for $CaCl_2$) 8.0 to 23, firing the mixture at a temperature of 1,000° to 1,200° C., and then at a temperature of 1,200° to 1,400° C. The product is then cooled and ground.

8 Claims, No Drawings

CEMENT AND PROCESS FOR PRODUCING SAME

BACKGROUND OF THE INVENTION

The present invention broadly relates to the industry of construction and building materials and cement industry and, more specifically, to cements and processes for producing the same.

Cements containing alite, belite, celite are known. These cements find an extensive use in industry, though they have a low activity over the initial hardening period.

A process for the production of the above-mentioned cement is known which comprises grinding a raw mixture consisting of a calcareous and an acidic components, followed by grinding the resulting cement clinker. During the grinding stage, various additives may be introduced into the clinker, for example gypsum.

This known process for producing the above-mentioned cement has the disadvantage of requiring a high calcination temperature. The cement clinker produced by this process has a low millability thus causing high power consumption for its grinding.

A cement containing 5 to 60% by weight of calcium chloroaluminate and above 5% by weight of alite, belite and celite as well as additives of anhydrite and silicofluoride is also known.

The presence of calcium chloroaluminate in the cement imparts to the cement an increased activity at early stages of hardening. However, preparation of this cement is associated with the necessity of incorporation of additives of anhydrite and silicofluoride in order to prolong the setting time, since the cement without the above-mentioned additives has a very short setting time which restricts the fields of its application. Furthermore, incorporation of such retarding additives causes the decreased activity of the cement within the controlled period.

A process for the production of this cement containing alite, belite and celite as well as calcium chloroaluminate is also known, which comprises calcination of a raw mixture consisting of a calcareous, silicaceous or aluminous components, as well as a ferric component and calcium chloride at a temperature within the range of from 1,300° to 1,400° C, followed by grinding of the thus-produced cement clinker. At the grinding stage various additives in the form of sulphates, nitrates, chlorides of alkali or alkali-earth metals can be introduced into the clinker.

The prior art process for the production of the above-mentioned cement has the disadvantages that it is impossible to obtain chlorosilicate minerals (highly-basic calcium chlorosilicate, calcium chloro-orthosilicate) in the clinker and requires a high (1,300° to 1,400° C) temperature of the clinker-formation process which necessitates a high consumption rate of the fuel. Furthermore, the cement clinker produced by this process features an insufficient millability which also requires a high power consumption for grinding of the clinker.

SUMMARY OF THE INVENTION

It is an object of the present invention to provide a cement composition which provides controlled setting periods due to a changed ratio between the minerals in the cement within the above-mentioned limits and requires no incorporation of no retarding additives.

It is an object of the present invention to provide a cement which possesses a high hydration activity, sufficient mechanical strength during the initial hardening period and ensures articles having considerable strength within the controlled hardening periods.

It is still another object of the present invention to provide a process for the production of cement possessing the above-mentioned properties which makes it possible to lower the clinker-formation process temperature and to reduce specific consumption rate of the fuel, and to increase millability of the cement clinker.

These and other objects are accomplished by a cement consisting of alite, belite, calcium chloroaluminate, which also incorporates, according to the present invention, a highly-basic calcium chlorosilicate, calcium chloroalumoferrite and calcium chloro-orthosilicate, the components being in the following proportions, parts by weight

| alite | 1 to 50 |
| belite | 1 to 45 |
| calcium chloroaluminate | 30 to 1 |
| highly-basic calcium chlorosilicate | 75 to 5 |
| calcium chloro-orthosilicate | 55 to 5 |
| calcium chloroalumoferrite | 2 to 22. |

The cement according to the present invention has the following properties:

| Setting times, minutes: | |
| --- | --- |
| Setting start point | 7 to 95 |
| Setting end point | 14 to 260; |

Compression strength for samples of 4×4×16 cm consisting of 1 part by weight of cement, 3 parts by weight of quartz sand and 0.5 part by weight of water after 28 days of hardening in water at the temperature of 20°±2° C, kgf/cm$^2$:

| after 1 day of hardening | 15 to 212 |
| after 3 days of hardening | 47 to 275 |
| after 7 days of hardening | 140 to 386 |
| after 28 days of hardening | 390 to 610. |

Specific power consumption for grinding of the cement clinker to the residue of 12% on a sieve with the hole diameter of 80 mcm is 11 to 15 kWt.hr/ton, while to the residue of 4.5% on the same sieve it is equal to 37-41 kWt.hr/ton.

No corrosion of steel reinforcement in samples of concrete produced from this cement is observed.

DESCRIPTION OF THE PREFERRED EMBODIMENTS

The cement according to the present invention is produced by the process which comprises blending of calcareous, silicaceous, aluminous, ferric components and calcium chloride to give a raw mixture which is then subjected to calcination at a temperature of from 1,000° to 1,400° C to give a clinker which is then cooled and ground; in doing so, according to the present invention calcination of the raw mixture is conducted in two stages: the former is conducted at a temperature within the range of from 1,000° to 1,200° C; the second stage of calcination is conducted at a temperature within the range of from 1,200° to 1,400° C, the components being contained in the raw mixture in the following proportions, parts by weight:

| | |
|---|---|
| calcareous component (calculated for CaO) | 34 to 44 |
| silicaceous component (calculated for SiO$_2$) | 9.5 to 17 |
| aluminous component (calculated for Al$_2$O$_3$) | 1.6 to 14 |
| ferric component (calculated for Fe$_2$O$_3$) | 0.8 to 5 |
| calcium chloride (calculated for CaCl$_2$) | 8.0 to 23. |

As the calcareous component use can be made of, for example, limestone; as the silicaceous component use can be made of quartz sand, diatomaceous earth; as the aluminous component use can be made of commercial alumina, china clay; as the silicaceous and aluminous components various clays can be used such as loess loam; as the ferric component - hematite, pyrite cinders, commercial iron oxide.

Together with calcium chloride the raw mixture composition should preferably include sodium chloride and/or potassium chloride in an amount ranging from 5 to 60% by weight of the calcium chloride employed.

The latter additives contribute to the intensification of the clinker-formation process and provide for an improved millability of the clinker.

Besides, the use of said chlorides of alkali metals enables the use of an alkali-containing dust recycle; it also enlarges the range of the starting materials relative to the chloride-containing component, whereby use can be made of, in particular, industrial wastes.

It is advisable to conduct the second calcination stage, for the production of a belite clinker, at a temperature within the range of from 1,200° to 1,250° C; for the production of an alite clinker this stage should be conducted at a temperature within the range of from 1,250° to 1,400° C.

Owing to the above-mentioned conditions, i.e. performing the calcination process in two stages, the most power-consuming part of the clinker-formation process is conducted at lowered temperatures, i.e. of the order of 1,000°–1,200° C.

The cement according to the present invention containing alite, belite, calcium chloroaluminate, a highly-basic calcium chlorosilicate, calcium chloro-orthosilicate, calcium chloroalumoferrite in the above-mentioned proportions makes it possible to reduce the maximum quantity of calcium aluminate in the cement from 60 to 30% by weight.

The cement requires no additive for the control of the hardening time.

The cement having compositions according to the present invention has a large range of setting periods as compared to the prior art cements (i.e. from several minutes to 4–6 hours), as well as a broader range of rates of the initial hardening.

The cement of the compositions according to the present invention containing an increased amount of a highly-basic calcium chlorosilicate or calcium chloroaluminate possesses a higher hydration activity especially over the initial period of hardening.

The cement containing an increased amount of belite and calcium ortho-chlorosilicate (dicalcium silicate) features an increased final density and mechanical strength of articles manufactured therefrom.

The above-discussed properties of the cement and the possibility of varying its mineral composition within a broad range as mentioned hereinabove enable an opportunity for an extensive use of the cement for different purposes.

Cements according to the present invention can be used in the manufacture of prefabricated reinforced concrete structures, in the erection of massive monolithic concrete structures and in other branches of construction works. Thus, the use of this cement provides a pronounced effect in hydropower construction, since it ensures an increased uniformity (integrity) of the concrete massive, a high mechanical durability thereof, water-proofness and resistance against the environment.

The cement with an increased content of calcium alumoferrite can be used for special purposes as a high-iron content cement.

The process according to the present invention makes it possible to use a lesser temperature of the clinker-formation process in the production of the cement. This lowered temperature is of the order to from 1,000° to 1,200° C which enables a decrease in specific consumption rates of the fuel by 5 to 10% as compared to the prior art process, wherein the raw mixture is calcined at a temperature within the range of from 1,300° to 1,400° C.

Furthermore, the clinker produced by the process according to the present invention has a higher (by 1.4–1.8 times) millability, whereby the power consumption for grinding is substantially reduced.

The process for the production of the cement according to the present invention is technologically simple and performed in the following manner.

The starting components, i.e. calcareous, silicaceous, ferric and chlorides such as CaCl$_2$, are subjected to a separate or a combined grinding (separate grinding of the mixture stipulates a subsequent homogenization of the raw mixture). The grinding can be effected both in the presence of water (wet grinding) and without it (dry grinding). In wet grinding, water is added at a rate of from 25 to 35% by the total weight of the starting components. In the case of wet grinding of the starting components, calcium chloride can be used as a dry product and as aqueous solutions thereof with a required concentration. After dry grinding, the resulting raw mixture can be granulated to obtain granules with a size of from 5 to 20 mm.

From the thus-prepared raw mixture there is obtained a cement clinker which is calcined by placing said raw mixture into a furnace, wherein the mixture is calcined at a temperature within the range of from 1,000° to 1,200° C. At the final, short-time stage of the calcination both in the furnace per se and in a special thermal unit the clinker is treated at a temperature within the range of from 1,200° to 1,400° C. The time of this additional treatment ranges from 5 to 40 minutes. As a result of this operation the content of chlorosilicate components (highly-basic calcium chlorosilicate and calcium chloro-orthosilicate) is reduced and the content of alite and belite is increased. In doing so, at a temperature of about 1,200°–1,250° C the clinker is enriched with belite, while at a temperature of 1,250°–1,400° C it is enriched with alite. Variation of the process parameters at the stage of calcination of the clinker makes it possible to produce the cement of a predetermined mineralogical composition and obtain the desired properties of the product.

For a better understanding of the present invention, the following specific examples are given hereinbelow. In all examples the cement activity is characterized by the ultimate compression strength determined for samples with the dimensions of 4×4×16 cm consisting of 1 part by weight of cement, 3 parts by weight of quartz sand, and 0.5 part by weight of water after 28 days of hardening in water at the temperature of 20°±2° C. The hardening rate is determined by the variation of mechanical strength determined by the above-mentioned method after 1 day, 3, 7, and 28 days. Setting times are determined for a normal-thickness dough on a Vicat instrument.

Millability of the cement clinker is determined by power consumption for its grinding to a predetermined fineness. Corrosion of steel reinforcement in concretes based on the cement according to the present invention is determined by a quantitative method by weight losses of reinforcement rods upon storage of a sample in the air atmosphere with a 100% relative humidity at the temperature of 20° C.

EXAMPLE 1

A raw mixture is prepared containing the following components taken in the above-specified amounts, parts by weight

| | |
|---|---|
| limestone (calculated for CaO) | 39.44 |
| quartz sand (calculated for SiO$_2$) | 15.03 |
| aluminous components (calculated for Al$_2$O$_3$O | 5.99 |
| pyrite cinders (calculated for Fe$_2$O$_3$) | 1.66 |
| commercial calcium chloride (calculated for CaCl$_2$) | 11 |
| commercial potassium chloride (calculated for KCl) | 10 |
| commercial sodium chloride (calculated for NaCl) | 2. |

Said components are subjected to a combined dry grinding. The ground product has a residue of at most 12% by weight on a sieve with the hole diameter of 80 mcm. The thus-prepared raw mixture is granulated to give granules of a 10–15 mm size.

The raw mixture in the granulated form is placed into a furnace, wherein calcination is performed at the temperature of 1,000° C to complete the clinker-formation process. At the final stage of the calcination the temperature is increased to 1,250° C. The calcined clinker is cooled in the air and ground in a ball mill to a residue of at most 12% on a sieve with the hole diameter of 80 mcm. Specific power consumption for grinding of the cement clinker to the residue of 12% on a sieve with the hole diameter of 80 mcm is 12.5 kW.hr/ton, and to the residue of 4.5% it is equal to 38 kW.hr/ton.

The final cement has the following composition, parts by weight:

| | |
|---|---|
| alite | 10 |
| belite | 1 |
| calcium chloroaluminate | 16 |
| calcium chloroalumoferrite | 8 |
| highly-basic calcium chlorosilicate | 10 |
| calcium chloro-orthosilicate | 55. |

The cement has the following characteristics:

| | |
|---|---|
| setting times, minutes: | |
| start point | 17 |
| end point | 26 |
| ultimate compression strength, kgf/cm$^2$: | |
| after 1 day | 82 |
| after 3 days | 124 |
| after 7 days | 196 |
| after 28 days | 387. |

No corrosion of steel reinforcement in concrete samples produced from the above-indicated cement is observed.

EXAMPLE 2

A raw mixture is prepared having the following composition, parts by weight:

| | |
|---|---|
| limestone (calculated for CaO) | 34 |
| loess loam (calculated for SiO$_2$) | 14 |
| (Calculated for Al$_2$O$_3$) | 5.76 |
| (calculated for Fe$_2$O$_3$) | 1.45 |
| commercial calcium chloride (calculated for CaCl$_2$) | 23. |

Grinding of these components, granulation of the raw mixture, cooling and grinding of the cement clinker are performed following the procedure described in the foregoing Example 1. Calcination is conducted in two stages: the first stage is conducted at a temperature within the range of from 1,050° to 1,100° C; the second stage — at the temperature of 1,200° C for 40 minutes to complete the clinker-formation process. The resulting cement has the following composition, parts by weight:

| | |
|---|---|
| alite | 1 |
| belite | 1 |
| calcium chloroaluminate | 11 |
| calcium chloroalumoferrite | 2 |
| highly-basic calcium chlorosilicate | 75 |
| calcium chloro-orthosilicate | 10. |

Specific power consumption for grinding of the cement clinker to the residue of 12% on a sieve with the hole diameter of 80 mcm is 11.8 kWt.hr/ton; to the residue of 4.5% it is equal to 37.2 kWt.hr/ton The final cement has the following characteristics:

| | |
|---|---|
| setting times, minutes: | |
| start point | 35 |
| end point | 54 |
| ultimate compression strength, kgf/cm$^2$: | |
| after 1 day | 212 |
| after 3 days | 275 |
| after 7 days | 386 |
| after 28 days | 610. |

No corrosion of the steel reinforcement is observed in samples of concrete produced from this cement.

EXAMPLE 3

A raw mixture is prepared having the following composition, parts by weight:

| | |
|---|---|
| limestone (calculated for CaO) | 35.4 |
| diatomite (calculated for SiO$_2$) | 9.5 |
| china clay (calculated for Al$_2$O$_3$) | 14.0 |
| hematite (calculated for Fe$_2$O$_3$) | 5.0 |
| commercial calcium chloride (calculated for CaCl$_2$) | 12. |

Grinding of these components, granulation of the raw mixture and grinding of the cement clinker are performed following the procedure described in the foregoing Example 1. Calcination in the first stage is conducted at the temperature of 1,000° C to complete the clinker-formation process, and the final calcination is conducted at the temperature of 1,200° C for 20 minutes.

Specific power consumption for the grinding of the cement clinker to the residue of 12% on a sieve with the hole diameter of 80 mcm is 14.7 kWt.hr/ton; that for the residue of 4.5% is 39.5 kWt.hr/ton.

The cement has the following mineralogical composition, parts by weight:

| | |
|---|---|
| alite | 2 |
| belite | 2 |
| calcium chloroaluminate | 30 |
| calcium chloroalumoferrite | 22 |
| highly-basic calcium chlorosilicate | 28 |
| calcium chloro-orthosilicate | 16. |

The cement has the following characteristics:

| | |
|---|---|
| setting times, minutes: | |
| start point | 7 |
| end point | 14 |
| ultimate compression strength, kgf/cm$^2$: | |
| after 1 day | 162 |
| after 3 days | 184 |
| after 7 days | 225 |
| after 28 days | 424. |

No corrosion of steel reinforcement is observed in samples of concrete produced from the above-described cement.

EXAMPLE 4

A raw mixture is prepared having the following composition, parts by weight:

| | |
|---|---|
| limestone (calculated for CaO) | 44 |
| quartz sand (calculated for SiO$_2$) | 17 |
| commercial alumina (calculated for Al$_2$O$_3$) | 1.6 |
| iron oxide | 2.24 |
| commercial calcium chloride (calculated for CaCl$_2$) | 8. |

Grinding of the above-given components, granulation of the raw mixture and grinding of the cement clinker is performed following the procedure described in Example 1 hereinbefore. Calcination is conducted at the temperature of 1,200° C to complete the clinker-formation process. At the final stage of the calcination the temperature is elevated to 1,400° C and the material is calcined at this temperature for 5 minutes.

Specific power consumption for grinding of the cement clinker to the residue of 12% on a sieve with the hole diameter of 80 mcm is 15.6 kW.hr/ton, while to the residue of 4.5% it is equal to 41.2 kW.hr/ton.

The resulting cement has the following composition, parts by weight:

| | |
|---|---|
| alite | 50 |
| belite | 34 |
| calcium chloroaluminate | 1 |
| calcium chloroalumoferrite | 5 |
| highly-basic calcium chlorosilicate | 5 |
| calcium chloro-orthosilicate | 5. |

The final cement has the following characteristics:

| | |
|---|---|
| setting times, minutes: | |
| start point | 95 |
| end joint | 260 |
| ultimate compression strength, kgf/cm$^2$: | |
| after one day | 12 |
| after 3 days | 26 |
| after 7 days | 264 |
| after 28 days | 574. |

No corrosion of steel reinforcement in concrete samples based on the above cement is observed.

EXAMPLE 5

A raw mixture is prepared having the following composition, parts by weight:

| | |
|---|---|
| limestone (calculated for CaO) | 39.7 |
| loess loam (calculated for SiO$_2$) | 15.30 |
| (calculated for Al$_2$O$_3$) | 6.13 |
| (calculated for Fe$_2$O$_3$) | 0.80 |
| commercial calcium chloride (calculated for CaCl$_2$) | 8.0. |

Grinding of said components, granulation of the raw mixture and grinding of the cement clinker are performed following the procedure described in the foregoing Example 1. Calcination is performed at the temperature of 1,150° C to complete the clinker-formation process. At the final stage of the calcination the temperature is elevated to 1,250° C. The resulting cement has the following composition, parts by weight:

| | |
|---|---|
| alite | 10 |
| belite | 45 |
| calcium chloroaluminate | 13 |
| calcium chloroalumoferrite | 2 |
| highly-basic calcium chlorosilicate | 20 |
| calcium chloro-orthosilicate | 10. |

Specific power consumption for the grinding of the cement clinker to the residue of 12% on a sieve with the hole diameter of 80 mcm is 13.9 kW.hr/ton, while that for the residue of 4.5% is 38.9 kW.hr/ton.

The final cement has the following characteristics:

| | |
|---|---|
| setting times, minutes: | |
| start point | 49 |
| end point | 140 |
| ultimate compression strength, kgf/cm$^2$: | |
| after one day | 22 |
| after 3 days | 30 |
| after 7 days | 140 |
| after 28 days | 390. |

No corrosion of steel reinforcement in concrete samples prepared from the above cement is observed.

EXAMPLE 6

A raw mixture is prepared having the following composition, parts by weight:

| | |
|---|---|
| limestone (calculated for CaO) | 10.33 |
| quartz sand (calculated for SiO$_2$) | 11.11 |
| china clay (calculated for Al$_2$O$_3$) | 11.79 |
| pyrite cinders (calculated for Fe$_2$O$_3$) | 2.46 |
| commercial calcium chloride (calculated for CaCl$_2$) | 15 |
| commercial potassium chloride (calculated for KCl) | 0.2 |
| commercial sodium chloride (calculated for NaCl) | 0.2. |

Grinding and blending of said raw mixture components is performed in the dry condition. The resulting raw flour is heated and pre-calcined at a temperature within the range of from 700° to 900° C, followed by the treatment of the material in a rotary furnace at a temperature within the range of from 1,100° to 1,150° C; at the final stage the calcination is performed at a temperature within the range of from 1,200° to 1,250° C for 30 minutes.

The thus-produced clinker is cooled and subjected to grinding.

Specific power consumption for grinding of the cement clinker to the residue of 12% on a sieve with the hole diameter of 80 mcm is 13.6 kW.hr/ton, while that for the residue of 4.5% is equal to 37.5 kW.hr/ton.

The final cement has the following composition, parts by weight:

|  |  |
|---|---|
| alite | 5 |
| belite | 10 |
| calcium chloroaluminate | 25 |
| calcium chloroalumoferrite | 10 |
| highly-basic calcium chlorosilicate | 32 |
| calcium chloro-orthosilicate | 14. |

The final cement has the following characteristics:

|  |  |
|---|---|
| setting times, minutes: |  |
| start point | 18 |
| end point | 26 |
| ultimate compression strength, kgf/cm$^2$: |  |
| after 1 day | 184 |
| after 3 days | 196 |
| after 7 days | 238 |
| after 28 days | 441. |

No corrosion of steel reinforcement is observed in concrete samples produced from the above cement.

What is claimed is:

1. A cement consisting of alite, belite, calcium chloroaluminate, a highly-basic calcium chlorosilicate, calcium ortho-chlorosilicate and calcium chloroalumoferrite, the components being present in the following proportions, in parts by weight:

|  |  |
|---|---|
| alite | 1 to 50 |
| belite | 1 to 45 |
| calcium chloroaluminate | 30 to 1 |
| highly-basic calcium chlorosilicate | 75 to 5 |
| calcium chloro-orthosilicate | 55 to 5 |
| calcium chloroalumoferrite | 2 to 22. |

2. A process for producing a cement consisting of alite, belite, calcium chloroaluminate, a highly-basic calcium chlorosilicate, calcium chloro-orthosilicate and calcium chloroalumoferrite, the components being in the following proportions, in parts by weight:

|  |  |
|---|---|
| alite | 1 to 50 |
| belite | 1 to 45 |
| calcium chloroaluminate | 30 to 1 |
| highly-basic calcium chlorosilicate | 75 to 5 |
| calcium chloro-orthosilicate | 55 to 5 |
| calcium chloroalumoferrite | 2 to 22, | comprising blending a calcareous, silicaceous, aluminous ferrous components and calcium chloride in the following proportions, parts by weight:

|  |  |
|---|---|
| calcareous component (calculated for CaO) | 34 to 44 |
| silicaceous component (calculated for SiO$_2$) | 9.5 to 17 |
| aluminous component (calculated for Al$_2$O$_3$) | 1.6 to 14 |
| ferrous component (calculated for Fe$_2$O$_3$) | 0.8 to 5 |
| calcium chloride (calculated for CaCl$_2$) | 8.0 to 23; | subjecting the resulting raw mixture to calcination in two stages: the first stage being carried at a temperature within the range of from 1,000° to 1,200° C, the second stage — at a a temperature within the range of from 1,200° to 1,400° C; the resulting clinker is cooled and ground.

3. A process as claimed in claim 2, wherein the raw mixture composition also contains chlorides of alkali metals selected from the group consisting of sodium chloride, potassium chloride and a mixture of both in an amount of from 5 to 60% by weight of the calcium chloride employed.

4. A process as claimed in claim 2, wherein the second stage of calcination is performed at a temperature within the range of from 1,200° to 1,250° C.

5. A process as claimed in claim 2, wherein said second stage of calcination is performed at a temperature within the range of from 1,250° to 1,400° C.

6. A process according to claim 2, wherein said first stage of calcination is carried out to complete the clinker-formation process and said second stage of calcination is carried out for a shorter period than said first stage to increase the proportion of said alite and belite in said cement.

7. A process according to claim 6, wherein the second stage of calcination is carried out for about 5 to 40 minutes.

8. A process according to claim 2, wherein the setting time of said cement is varied without the introduction of setting time retarding agents by varying the proportion of alite and belite in said cement composition and wherein said first stage of calcination is carried out to complete the clinker formation process and said second stage of calcination is carried out for the period and temperature required to increase the proportion of said alite and said belite to the desired proportions.

* * * * *